United States Patent [19]

Halloran

[11] Patent Number: 4,998,000
[45] Date of Patent: Mar. 5, 1991

[54] CLOSURE DEVICE FOR MICROWAVABLE VESSELS

[76] Inventor: Edward J. Halloran, 111 South Bend Road E, Hamilton, Ontario, Canada, L9A 2B5

[21] Appl. No.: 517,860

[22] Filed: May 2, 1990

[51] Int. Cl.⁵ ............................................. H05B 6/80
[52] U.S. Cl. ...................... 219/10.55 E; 219/10.55 R; 99/DIG. 14; 16/114 A; 16/119; 294/31.2
[58] Field of Search .................. 219/10.55 E, 10.55 F, 219/10.55 R; 294/31.2, 31.1, 33; 16/114 R, 114 A, 119; 99/DIG. 14

[56] References Cited

U.S. PATENT DOCUMENTS

| | | | |
|---|---|---|---|
| 2,281,015 | 4/1942 | Weise | 16/114 A |
| 2,325,841 | 8/1943 | Faber | 16/114 A |
| 2,982,577 | 5/1961 | Serio | 16/114 A |
| 4,033,009 | 7/1977 | Hoinash | 16/114 R |
| 4,158,464 | 6/1979 | Bowen et al. | 294/31.2 |
| 4,644,858 | 2/1987 | Liotto et al. | 219/10.55 E |
| 4,847,459 | 7/1989 | Desai | 219/10.55 E |
| 4,868,360 | 9/1989 | Duncan | 219/10.55 E |
| 4,940,868 | 7/1990 | Paik et al. | 219/10.55 E |

*Primary Examiner*—Philip H. Leung
*Attorney, Agent, or Firm*—David P. Gordon

[57] ABSTRACT

A closure device is provided and generally comprises a "U" shaped structural member preformed to a size and shape suitable to join two vessels into a microwavable utensil. The closure device has opposed finger grips and a rod shaped handle for moving and handling the microwavable utensil formed by the closure device. The plastic or metal material from which the closure device is made is resilient so that when the closure is deformed, placed in position around the two vessels and then released it will return to its original preformed shape securing the two vessels in position. The lower and upper vessels joined together by the closure device are held in place by the legs of the "U" shaped structural member. The legs are applied horizontally around most but not all of the periphery of the joined vessels with the upper leg restraining the upper vessel and the lower leg restraining the lower vessel, and with the relationship of the upper and lower vessels being maintained by the web of the "U" channel which is attached to the upper and lower restraining legs. The closure device does not enclose the entire periphery of the two vessels to be joined which results in a small open section of periphery defined by the two ends of the closure device. This space so defined serves the function of providing a device of venting the interior of the utensil to the atmosphere.

12 Claims, 1 Drawing Sheet

CLOSURE DEVICE FOR MICROWAVABLE VESSELS

BACKGROUND OF THE INVENTION

This invention relates generally to microwavable utensils. More particularly, this invention relates to a closure device which permits the joining of two generic cooking vessels such as dishes or bowls together to form a microwavable cooking utensil.

Cooking in a microwave oven is popular because of its speed and efficiency. Many foods are more efficiently cooked by microwave when a lid covers the top of the food containing vessel. The lid traps air over the food reducing the amount of volume that has to be heated making the system more efficient. Certain foods such as vegetables may be better cooked with a small amount of water in the lower vessel. The microwave energy turns the water in the lower vessel to steam and the steam helps cook the vegetables. The lid formed by the upper vessel helps to trap the steam and cook the vegetables.

The vessels are best made from materials that are transparent to microwave energy because they will not become hot from that type of energy. However, microwavable cooking utensils can become hot by means of energy transfer such as conduction and convection arising from the food itself as it becomes hot.

The lid of a microwavable cooking utensil must not be so tightly applied that there is danger of explosion due to steam pressure created by heating the water vapor in the air trapped by the lid. For this reason lids of vessels used in microwave cooking are not so tightly sealed that excess pressure cannot vent to the atmosphere.

Fast microwave heating can result in unequal heating of food leaving part of the food cold and part hot. This problem is remedied by interrupting the cooking process and physically rotating the utensil holding the food within the microwave oven about its vertical axis so that the microwave energy is more evenly dispersed through the food mass.

Many users of microwave ovens use a clear thin plastic wrap over the top of bowls and utensils as a lid when cooking. This alternative when multiplied by millions of users can have a ecological impact because of the energy consumed in making the plastic and the final problem of disposing of it when it is no longer wanted.

The prior art has addressed some of the above stated problems. For example, a microwavable lid has been described in U.S. Pat. No. 4,847,459 issued to Desai. The Desai patent discloses a bowl shaped microwave dish with a cover which promotes the heating of food. The Desai arrangement requires the bottom portion of the vessel and the lid to conform to a custom design with certain interlocking offset steps molded into the lid and into the bottom dish which provide the restraint necessary to hold the lid in place during the cooking process while providing necessary venting.

The problem of the user handling hot utensils has been addressed by U.S. Pat. No. 4,033,009 issued to Hoinash which discloses removable handles that are applied to cooking vessels that have thin arcuate shaped handles. The handles described have thin arcuate shaped slots which slip over the arcuate handles of the dish or bowl. This solution is limited to those dishes which have the type of handle described and the disclosed slip on handle has no other purpose than to provide support and means to carry the hot dish without burning the user.

U.S. Pat. No. 4,158,464 issued to Bowen et al. shows a plastic collar that is placed around a restriction in a vessel with a silicone rubber pressure absorbing material between the plastic collar and the vessel the purpose of which is to protect the vessel and assure a firm fit of the collar. The collar so applied has means that allow the attachment of a removable handle to the collar for use in moving and manipulating the container.

U.S. Pat. No. 4,644,858 issued to Liotto et al. describes two semicircular rims of metal hinged at one point so that they can be closed around a flat circular base to form a pan. The described pan allows easy removal of the baked material from the pan.

While the devices of the prior art are effective for their particular purposes, they do not contemplate the joining of two generic vessels to form a bowl and lid. Moreover, in moving and rotating the devices described by the prior art and to protect the user from possibly coming in contact with a hot utensil, generally a removable handle of some type has been relied upon or has had to be supplied in conjunction with a device on the utensil. These separate items add further undesirable complication and cost for the user.

SUMMARY OF THE INVENTION

The object of the invention is to provide a closure device by which means a lower vessel may be joined to an upper vessel or lid, the parts so joined comprising a microwavable cooking utensil.

Another object is to provide a closure device that can join commonly found kitchen vessels such as dishes or bowls of substantially equal diameter into a microwavable utensil when one of the vessel is inverted relative to the other so that the rims of the two vessels make contact substantially along the entire periphery of the vessels.

A further object of the invention is to provide a closure device which allows the user to pick up and move the microwavable cooking utensil without danger of the upper and lower vessels separating.

Yet another object is to provide a closure device which allows the user to pick up and rotate the microwavable cooking utensil one hundred and eighty degrees about its horizontal axis thereby reversing the position of the top and the bottom of the utensil in those instances when at most a minimal amount of water is used in the utensil with the food being cooked.

A further object is to provide a closure device that minimizes the possibility of the user coming into contact with a hot surface of the cooking utensil.

In accordance with the objects stated above a closure device is provided and generally comprises a "U" shaped structural member preformed to a size and shape suitable to join the selected vessels. The closure device has opposed finger grips and a suitably shaped handle for moving and rotating the microwavable utensil formed by means of the closure device. The plastic or metal material from which the closure device is made is resilient so that when the closure device is deformed and then released it will return to its original preformed shape.

The lower and upper vessels joined together by the closure device are held in place by the legs of the "U" shaped structural member. The legs are applied horizontally around most but not all of the periphery of the joined vessels with the upper leg restraining the upper vessel and the lower leg restraining the lower vessel, and with the relationship of the upper and lower vessels being maintained by the web of the "U" channel which is attached to the upper and lower restraining legs. For some uses the "U" shaped structural member may have a resilient material inserted between the legs of the "U" to make a more effective seal if that is a requirement. The closure device is deformed as required to position it around the two vessels to be joined thereby applying enough pressure by means of the horizontal legs to hold the vessels in position.

By not enclosing the entire periphery of the two vessels to be joined, a small open section of vessel periphery is defined by the two ends of the closure device. This open space serves the function of providing a means of venting the interior of the utensil to the atmosphere. To each end of the closure device is attached a semicircular finger grip, the grips being opposed to each other. A small rod shaped device used as a handle is attached on the outside of the closure device located as an extension of the diameter defined by the center of the open section of the periphery and the center of the partial circumference of the preformed closure device. The finger grips and the handle are made of materials selected for their heat insulating properties.

When the user desires to move or rotate the cooking utensil the user will grasp the rod shaped handle with one hand and with two fingers of the other hand squeeze together the finger grips which increases the pressure of the closure device on the upper and lower vessel exterior walls allowing the cooking utensil to be carried without the possibility of separation of the lower and upper parts of the cooking utensil.

Additional objects and advantages of the invention will become apparent to those skilled in the art upon reference to the detailed description in conjunction with the accompanying drawings.

DETAILED DESCRIPTION OF INVENTION

Figure 1:
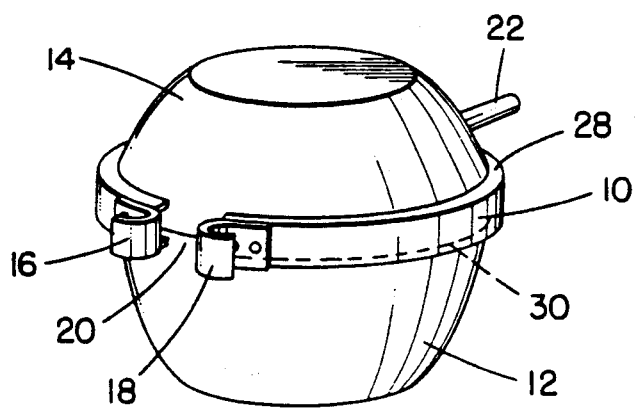
FIG. 1 is an isometric view of the closure device shown as it is normally attached to an upper and lower vessel, the closure device, upper, and lower vessels forming a combination microwavable utensil.

The preferred closure device 10 seen in FIGS. 1-4 in conjunction with the lower cooking vessel 12 and the upper vessel or lid 14 comprise a microwavable cooking utensil. The closure device 10 is preferably comprised of a U-shape structural member 11, opposed finger grips 16 and 18 attached to the ends of the U-shaped structural member 11, and a rod shaped handle 22 attached to the U-shaped structural member 11 as shown.

Figure 2:
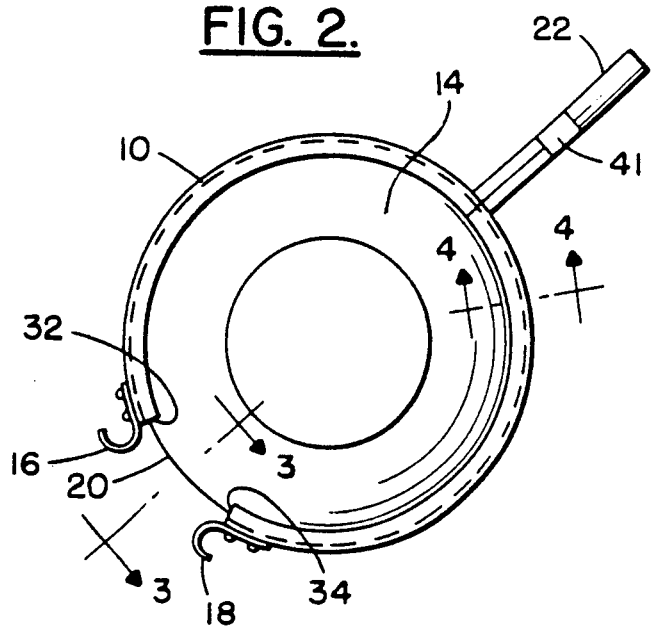
FIG. 2 represents a plan view of the enclosure device of FIG. 1 showing the geometric relationship of the rod handle to the ends of the device to which are attached the opposed finger grips.
Figure 3:
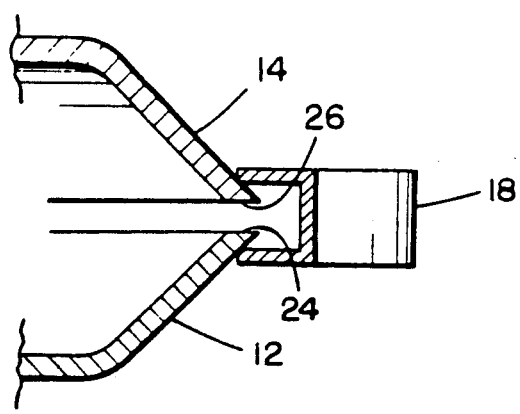
FIG. 3 is a cross section of the two vessels showing the mating surfaces of the rims taken along line 3—3 of FIG. 2.

FIG. 3 represents a section through the part of the periphery of the cooking utensil which is not supported by the closure device as shown by FIG. 2. The lower vessel 12 has an upper open rim 24 ("rim" being defined as the peripheral planar surface of an open vessel between and substantially perpendicular to the outside and inside walls of the vessel) and the upper vessel or lid 14 has an open rim 26. In order for the closure device to be effective, the upper rim 26 and the lower rim 24 preferably make contact along substantially the entire periphery of the two rims. This is accomplished by the upper vessel being inverted upon the lower vessel so that the rims of the two touch. The two vessels to be used can be ordinary commonly found vessels such as bowls, other types of vessels, or a vessel and a lid as desired. The only requirement is that the rims 24 and 26 shown in FIG. 3 substantially contact each other. There is no requirement that the vessels be custom made to work with the closure device 10. The open space between points 16 and 18 specifically referred to as area 20 serves as the major vent for maintaining atmospheric pressure within the cooking utensil.

Figure 4:
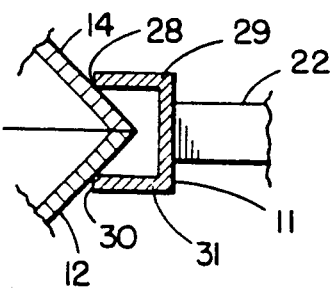
FIG. 4 is a cross section of the two vessels showing the preferred embodiment of the closure device and the rod handle taken along line 4—4 of FIG. 2.

The "U" shaped structural member 11 is made preferably of a preformed (i.e. spring loaded) reinforced plastic or a metal having sufficient resiliency so that it will withstand a large number of deformations and still return to its original shape when released. The section shown by FIG. 4 shows the lower vessel 12 and the upper vessel 14 and the point 28 where the upper leg 29 of the "U" shaped structural member makes contact with and supports the upper vessel. In like manner FIG. 4 shows where the lower horizontal leg 31 of the "U" shaped member makes contact at point 30 with the lower vessel and supports it in position. The vertical web 35 connecting the two horizontal legs provides the rigidity required to keep the upper and lower vessels correctly positioned.

As seen in FIG. 2, the closure device is preformed into a circular shape of a selected diameter, but the closure device does not make a complete circle (i.e. it does not circumscribe the entire circumference) and as shown a small section is purposefully left out. This makes it possible to deform the closure device so that it can be spread apart in applying the closure device to the vessels, and so that it can be squeezed tightly around the vessels when manipulating the vessels as described below. The gap at the ends of the closure device is identified by points 32 and 34 which mark respective ends of the U shaped structural member 11. A semicircular finger grip is attached to each end of the closure device at points 32 and 34. As shown in FIG. 2, the finger grips are in opposed positions. The rod handle 22 is diametrically opposite the center of the gap defined by points 32 and 34. If desired, the rod handle 22 may include an insulating portion 41 which would inhibit heat transfer to the extremity of the rod handle 22.

The closure device 11 is used in the following manner. Two vessels with matching rims are selected. One of the vessels is set on its bottom with the rim at the top of the vessel up in a horizontal plane. The other vessel is inverted so that its rim is horizontal but below the normal base of the vessel and thus is positioned to become the top vessel or lid. The rim of the top vessel is in substantial contact with the rim of the lower vessel. When the rims are in contact, the user takes the closure device 11 and puts one hand around the area of point 32 and the other hand around the area of point 34 and spreads the closure device deforming it enough so that it can be applied around the periphery of the bowls. When so applied and released, the bottom vessel 12 is supported by the bottom horizontal leg 31 and the upper vessel 14 is supported by the upper horizontal leg 29 as shown by FIG. 4., with the legs thereby exerting a force around most of the perimeter of the upper and lower vessels along a continuous arc indicated by points 28 and 30 of FIG. 4. The force exerted is sufficient to keep the upper and lower vessels in place during the cooking process.

Movement of the microwavable utensil (comprised of the vessels and the closure 11) from a counter to a microwave oven and back is accomplished in the following manner. The user, preferably using protective gloves, with one hand grasps the rod handle 22, and with two or more fingers (the thumb plus one or more fingers) of the other hand grasps and squeezes together the finger grips 16 and 18. This action applies additional force along most of the periphery of the upper and lower vessels (along arcs 28 and 30) securing them firmly in place so that the user can apply a lifting force to the rod handle 22 and finger grips 16 and 18 and move the microwavable utensil to the microwave oven or back as the need arises. Further, a user may rotate the soformed utensil in desired manners, by similarly grasping rod handle 22 and finger grips 16 and 18 and turning the utensil around its vertical axis or upside down around its horizontal axis. Applications for turning the utensil upside down include the cooking of popcorn and other situations where at most a minimal amount of water is utilized.

To separate the upper vessel from the lower vessel, the user grasps the finger grip 16 with one hand and the finger grip 18 with the other hand and spreads them apart once again deforming the closure device 11. Once the closure device is deformed sufficiently it can be removed from the vessels by slipping it off. The user should then release the pressure on the ends of the closure device and it will return to its original shape. The closure device 11 can then be put aside and the upper vessel 14 can be lifted off.

Figure 5:
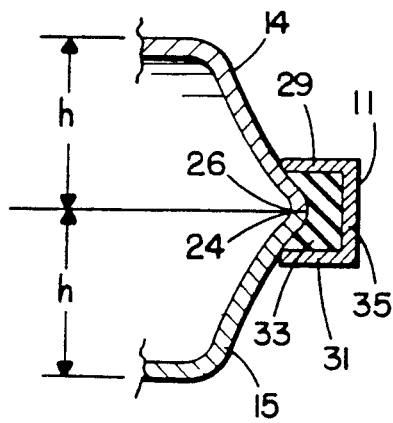
FIG. 5 is a cross section of another embodiment of the closure device showing a resilient material in the web of the closure device for the purpose of partially sealing the joint between the two vessels.
Figure 6:
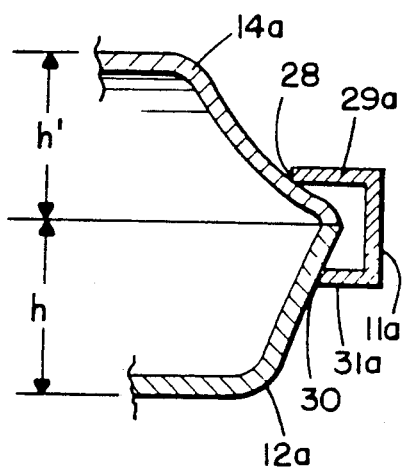
FIG. 6 is a cross section of another embodiment of the closure device showing the device with unequal horizontal supporting legs for use with vessels not entirely symmetrical with each other and showing that each vessel may also be of different heights.

FIGS. 5 and 6 represent different embodiments of the closure device 11. FIG. 5 shows the closure device with a resilient filler 33 filling the center of the "U" shaped structural member 11. The purpose of this arrangement is to partially seal the outside edges of rims 24 and 26 of the lower and upper vessels. FIG. 5 also shows a symmetrical relationship of the upper and lower vessels as well as a symmetrical relationship of legs 29 and 31, where the legs are of identical length.

FIG. 6 is an embodiment of the closure device 11a for vessels 12a and 14a which are not symmetrical. Closure device 11a has horizontal supporting legs of unequal length. In this arrangement the upper horizontal leg 29a is longer than the lower horizontal leg 31a. With closure device 11a, vessels which have the same rim diameter but are not symmetrical to each other in shape or in height (as shown by the symbols h and h') are accommodated. While FIG. 6 shows a bottom vessel 12a of smaller height h than the height h' of upper vessel 14a, it will be appreciated that the lower vessel may be the one with the larger height, and the upper vessel 14a could simply comprise a shallow lid. In that case, the closure device 11a need only be inverted from the position shown to accommodate the new combination.

There has been described and illustrated herein closure devices for microwavable utensils. While particular embodiments of the invention have been described, it is not intended that the invention be limited thereby, as it is intended that the invention be as broad in scope as the art will allow. Thus, while a U-shaped structural member was disclosed, it will be appreciated that the closure device may be V-shaped, H-shaped or otherwise shaped, provided two legs which will contact the respective upper and lower vessels is provided. Similarly, while the closure devices were described as being substantially circular, it will be appreciated that similar devices could be provided for other shaped utensils. Although the handle is shown as a rod, it should be recognized that there are other useful shapes that such as a knob or a strip that would run along a portion of the outside circumference of the preformed closure device which will perform the identical function. Likewise, while the finger grips are shown as arcuate in shape, finger grips of other shapes could be utilized. The finger grips and/or the handle may be either attached separately or made as an integral part of the closure device. Therefore, it will be apparent to those skilled in the art that yet other changes and modifications may be made to the invention as described without departing from the spirit and scope of the invention as so claimed.

I claim:

1. A closure device for joining a lower microwavable vessel to an upper microwavable vessel, the lower and upper microwavable vessels having rims subscribing essentially the same circumference so that they can contact each other along substantially the entire circumference, the closure device comprising:
    (a) a preformed resilient structural member having first and second legs fixed one relative to the other, and having a circumference of substantially similar shape to the circumference of the rims and extending only partially around said circumference of said rims thereby providing said structural member with first and second ends;
    (b) first and second opposed finger grips coupled respectively to said first and second ends of the resilient structural member; and
    (c) a handle attached to the outside of the structural member;
    wherein said closure device, together with said lower and upper microwavable vessels provide a microwavable utensil having a steam release, and said first and second opposed finger grips in conjunction with said handle provide a means for manipulating said microwavable utensil.

2. A closure device according to claim 1, wherein: said preformed resilient structural member is U shaped.

3. A closure device according to claim 2, wherein: said preformed resilient structural member is made of plastic.

4. A closure according to claim 3, further comprising:
    (d) a resilient sealing material attached to and located between said first and second legs.

5. A closure device according to claim 4, wherein: said first and second legs of the resilient structural member are of equal length.

6. A closure device according to claim 4, wherein: said first and second legs of the resilient structural member are of unequal length.

7. A closure device according to claim 2, wherein:
said preformed resilient structural member is made of metal.

8. A closure device according to claim 2, wherein:
said first and second legs of the resilient structural member are of equal length.

9. A closure device according to claim 2, wherein:
said first and second legs of the resilient structural member are of unequal length.

10. A closure according to claim 1, further comprising:
(d) a resilient sealing material attached to and located between said first and second legs.

11. A closure according to claim 10, wherein:
said resilient sealing material is insulating.

12. A closure device for joining a lower microwavable vessel to an upper microwavable vessel, the lower and upper microwavable vessels having rims subscribing essentially the same circumference so that they can contact each other along substantially the entire circumference, the closure device comprising:

(a) a preformed resilient U shaped plastic structural member having first and second legs of equal length fixed one relative to the other, and having a circumference of substantially similar shape to the circumference of the rims and extending only partially around said circumference of said rims thereby providing said structural member with first and second ends;

(b) first and second opposed grips coupled respectively to said first and second ends of the resilient structural member;

(c) a handle attached to the outside of the structural member;

wherein said closure device, together with said lower and upper microwavable vessels provide a microwavable utensil having a steam release, and said first and second opposed finger grips in conjunction with said handle provide a means for manipulating said microwavable utensil; and (d) a resilient, insulating, sealing material attached to and located between said first and second legs.

* * * * *